Aug. 13, 1946.    G. OGURKOWSKI    2,405,708
CONSTANT SPEED MOTOR SYSTEM
Filed Dec. 27, 1943
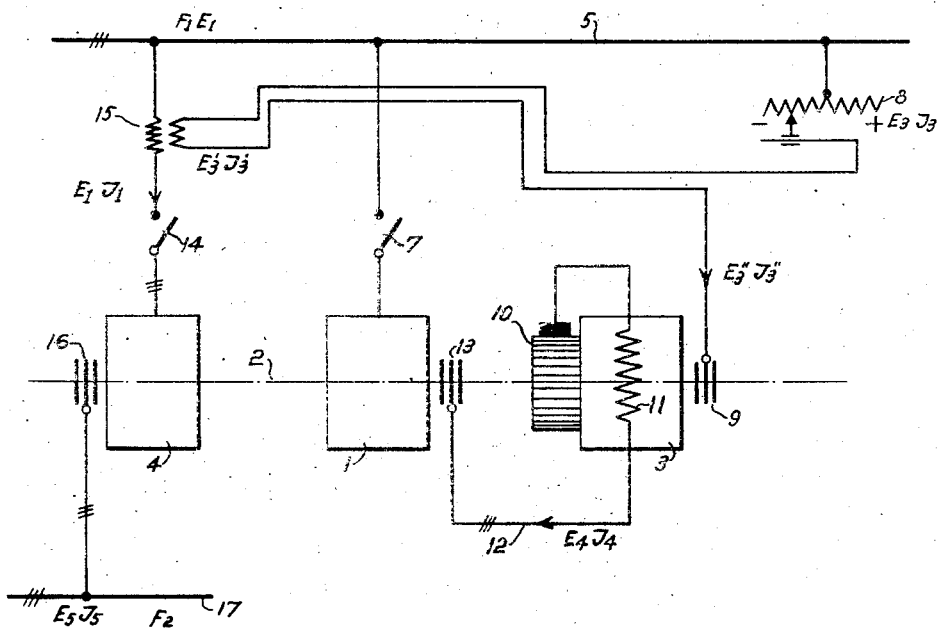
INVENTOR
GEORGES OGURKOWSKI
BY
ATTORNEY Patented Aug. 13, 1946

2,405,708

UNITED STATES PATENT OFFICE 2,405,708

CONSTANT SPEED MOTOR SYSTEM

Georges Ogurkowski, Zug, Schonbuhl, Switzerland, assignor to Landis & Gyr, A. G., a body corporate of Switzerland Application December 27, 1943, Serial No. 515,788
In Switzerland December 11, 1942

2 Claims. (Cl. 172—281)

*Arrangement for speed-compounding of a three-phase generator-cascade as prime mover of an asynchronous audio-frequency generator*

Devices for remote tariff control with audio-frequent control currents superimposed on the network require exact constancy of the control frequency. The special reason for this resides in the fact that the blocking elements preventing the energy at the checking places from leaving the line to be controlled possess an exceedingly sharp resonance curve. Another reason for the high constancy of the control frequency lies in the fairly pronounced selectivity of the receiver relays in use.

As prime mover for the audio-frequency generators a combination of a three-phase asynchronous motor and a special machine is particularly convenient, this machine impressing onto the rotor of the asynchronous motor an additional regulating voltage of slip frequency. This special machine consists of a frequency convertor, that is a D. C. armature with slip ring connections rotating in a coil-less stator. Preferably, however, this frequency convertor would be provided with a compensating winding on the stator having for its duty to nullify the field established by the rotor currents in the armature. Thus, for energizing the frequency convertor, would be necessary only the transmitter capacity (Erregerleistung), so that the whole arrangement may then be controlled without any substantial loss of energy. There is, however, an objection to this driving method in that the drop in speed thereby ensuing between no-load and full load is exactly equivalent to that of a normal motor. As in the nature of things a frequency variation is involved therewith which naturally is of the same order as the slipped number of revolutions, i. e., about 3–4%, care must be taken either to nullify completely this drop in speed or to compound it by an arrangement whatsoever. This phenomenon produces a particularly disagreeable effect with the synchronous selection method in which short impulses of, say 0.3 s. duration are picked up.

According to the invention, with systems using an asynchronous audio-frequency generator for producing the audio-frequency, the additional regulating voltage is no longer derived from the stator circuit of the asynchronous motor, but is a function of the exciting current of the driven audio-frequency generator so that speed variations are entirely nullified. This can be accomplished by providing means which generates a voltage from the power component of the exciting current of the audio-frequency generator, said voltage being proportional to the mechanical brake moment of the generator. This voltage is in phase with the line voltage and is transmitted as the regulating voltage through the frequency convertor over to the rotor circuit of the asynchronous motor to exert a driving moment therein. The magnitude of this driving moment is such that the sum of the torques developed in all the three machines by the load of the audio-frequency generator is as near to zero as possible.

The nature of the invention will be understood from the following specification taken with the accompanying drawing in which one embodiment is illustrated by way of example.

In the drawing, the numeral 1 denotes an asynchronous motor driving across a shaft 2 on the one hand a frequency convertor 3 and on the other hand an audio-frequency generator 4. The system is fed through a network 5. In the stator circuit of the asynchronous motor there is a switch 7. From network 5 a lead goes across a speed regulating transformer 8 and the secondary winding of the compound transformer 15 over to the slip rings 9 of the frequency convertor 3. A compensating winding 11 of the frequency convertor 3 lies on the one hand on collector 10 of the frequency convertor and on the other hand, across a line 12, on slip rings 13 of the asynchronous motor 1.

Numeral 4 designates an audio-frequency generator driven through the shaft 2. The audio-frequency generator 4 is put on network 5 across a switch 14 and a series-transformer 15. The stabilized audio-frequency voltage is derived from the slip rings 16 of the audio-frequency generator 4 and carried to a network 17.

The effect of the known arrangement is as follows:

On the shaft 2 of the asynchronous motor 1 a frequency convertor 3 rides, being compensated or not according to requirement. The convertor has for its duty to convey to the asynchronous motor the regulating voltage $E_4$ of slip frequency. This permits regulation of the number of revolutions over a specified range when the adjustable voltage $E_3$ with the network frequency is conveyed to the slip rings 9 through the speed regulating transformer 8. If the voltage $E_3=0$, we obtain the normal speed characteristic of the asynchronous motor. If $E_3$ possesses a declared value so that $E_4$ counteracts the induced rotor voltage, the result is the characteristic sub-synchronous operation. If $E_4$ acts in the opposite way so that $E_4$ acts in phase with the induced rotor voltage the result is the characteristic hyper-synchronous operation. But with the mechanical load of the machines there always follows between no-load and full load a certain drop in speed $\Delta n$, which in its essentials is determined by the total ohmic resistance of the rotor circuit of the asynchronous motor.

Substantially different therefrom appears the effect of compounding by the compound transformer 15. In prior art, the additional regulating voltage $E_3'$ is produced by the stator current of the asynchronous motor 1 and hence is dependent on slip. Closer contemplations, however, show that a full compounding with normal means is impossible. The compound transformer 15 as well as the frequency convertor 3 become bulky and expensive, even if a substantial drop of speed is allowed for.

It should be noted that only the component of the regulating voltage lying in phase with the rotor voltage of the asynchronous motor has for its effect a change of speed, as the ohmic component of the rotor current alone develops torque. The reactive component of the regulating voltage sets up more or less wattless currents at the stator end of the asynchronous motor without, however, affecting the torque or the number of revolutions. In practice, this sharp separation does not occur; rather does the reactive component of the regulating voltage, too, act to provide speed-regulating in a certain range of the load. Inversely, in other load ranges, the watt or active component of the regulating voltage also acts as phase-compensating upon the stator current of the asynchronous motor. These phenomena, however, are not taken into consideration here as being immaterial.

To make the invention well understood a somewhat closer reference to certain properties of the asynchronous audio-frequency generator must be made. It is known that every induction machine represents a universal transformer liable to be modified as voltage-, phase- or frequency convertor, so that thereby a higher frequency may likewise be attained. For this purpose a standard induction machine is utilized bearing multipolar three-phase windings on its stator and rotor. If it is intended to derive higher frequency currents from the rotor, it has to be driven contrariwise to the stator rotary field.

Suppose now $f_1$ be the frequency of the exciting voltage, $f_2$ the frequency of the produced audio-frequency voltage, and $p$ the pole-pair number of the machine, then $f_2$ is determined by the relative speed of rotary field and rotor winding, viz:

$$\omega_2 = \omega_1 + \omega_m;\ \frac{2\pi f_2}{p} = \frac{2\pi f_1}{p} + \frac{\pi n}{30};\ f_2 = f_1 + \frac{pn}{60}$$

For a 18-polar machine ($p=9$) would be for instance: $f_2=500$ cycles per second with $n=3000$ R. P. M. and $f_1=50$ cycles per second.

The slip of the generator is thereby seen to be as follows. Let $n_1$ be the synchronous number of revolutions with the frequency $f_1$, that is to say $$f_1 = \frac{pn_1}{60}$$

the slip is then $$s = \frac{n_1 - n}{n_1} \text{ and as } n = -n_m\ s = \frac{n_1 + n_m}{n_1} = \frac{\frac{60 f_1}{p} + \frac{(f_2 - f_1) 60}{p}}{\frac{60 f_1}{p}} = \frac{f_2}{f_1}$$

for $f_1=50$ cycles per second and $f_2=500$ cycles per second so that $s=10\%$.

The capacity balance of the asynchronous audio-frequency generator with negligible losses may be simply represented as follows, if $w_1$ denotes the number of the primary windings on the stator, $w_2$ the number of the secondary windings on the rotor, $\phi$ the flux per pole-pair, $\mathscr{E}_1$ the E. M. F. induced per phase in the stator, and $\mathscr{E}_2$ the E. M. F. induced per phase in the rotor:

$$\mathscr{E}_1 = 4.44 . f_1 . w_1 . \phi . 10^{-8}\ \ \frac{\mathscr{E}_2}{\mathscr{E}_1} = \frac{f_2 w_2}{f_1 w_1}$$
$$\mathscr{E}_2 = 4.44 . f_2 . w_2 . \phi . 10^{-8}$$

$\mathscr{E}_1$ and $\mathscr{E}_2$ are in phase.

As further, by ignoring the magnetizing current $$\frac{\mathscr{F}_2}{\mathscr{F}_1} = \frac{w_1}{w_2} \text{ thus } \frac{\mathscr{E}_2 . \mathscr{F}_2}{\mathscr{E}_1 . \mathscr{F}_1} = \frac{f_2}{f_1} = s$$

The secondary real power taken up by the consumer emanates consequently only partially from the mechanical output $W_m$ of the shaft. The other part $W_1$ is derived from the network by way of transformer and we get thus for the mechanically led real power $$W_m = W_2 - W_1;\ W_2 = sW_1;\ W_1 = \frac{W_2}{s}$$

$$W_m = W_2 - \frac{W_2}{s} = W_2\left(1 - \frac{1}{s}\right) \frac{W_1}{W_m} = \frac{1}{(1-s)}$$

If by means of high-speed regulators, &c, measures are taken to keep constant the primary frequency, $f_1$, the primary voltage $E_1$ and the mechanical speed $n_m$, this distinctly signifies that the active component of the primary exciting current is proportional to the mechanical moment of the generator.

The above summarized properties of the asynchronous audio-frequency generator are applied for producing that voltage which as additional regulating voltage brings forward the required action in the asynchronous motor 1. This consists in the fact that by the aforementioned regulating voltage a starting moment is exerted in the asynchronous motor which is exactly equal in magnitude to the brake moment ensuing by the load of the audio-frequency generator. As in this event the sum of all the torques developed by the load, no variation of speed occurs.

According to this invention, in this exciter circuit, however, there is now the series-transformer 15 which conveys to the slip rings 9 the additional regulating voltage $E_3$ which depends no longer on the stator current of the asynchronous motor, but upon the exciting current of the audio-frequency generator 4. According to what precedes the latter is driven against its rotary field and produces at the slip ring end 16 the audio-frequent voltage $E_5$ of the frequency $f_2$ which is conveyed to the consumers. Further, by the aid of the speed-regulating transformer 8 any sub- or hyper-synchronous number of revolutions may be set within the regulating range given by the voltage $E_3$.

With unloaded audio-frequency generator the voltage $E_3'=0$; the no-load speed being determined by the speed-regulating transformer 8 alone. As soon as a voltage arises on the secondary end of the series-transformer 15 (i. e., upon excitation of the audio-frequency generator 4), the additional regulating voltage appears at a definite amount according to the load and lumps together with $E_3$ to the exciting voltage $E_3''$ of the frequency convertor. Thereby, as with sub-synchronous operation in general, the voltage $E_3$ will provide for itself alone a rotor voltage $E_4$ which counteracts the rotor voltage of the asynchronous motor. $E_3'$ has then to be so set as to counteract the pressure $E_3$.

The operation may still be disclosed by a concrete example. Let switch 14 first be open and $E_1=500\ V=$const., $f_1=50$ cycles per second$=$const. Assume further the turns ratio of the windings between stator and rotor of the asynchronous motor be $\ddot{u}=1:1$, and the no-load speed sub-synchronously set at 10% by means of the voltage $E_3$. The rotor voltage is then $E_{4rot}=50$ volts. At no-load, too, the voltage of the frequency convertor $E_{4FU}\cong 50$ volts being put against the pressure $E_{4rot}$, so that actually only a slight voltage difference remains effectual in the rotor circuit which provides the necessary current for the torque of the losses to be covered. As $E_4\cong E_3$, hence must also $E_3=E_3''$, as at the outset $E_3'=0$, consequently $E_3\cong 50$ volts. The resistance in the rotor circuit is now supposed to be so that the asynchronous motor considered by itself develops the full torque with a slip of $s=3\%$, for which a rotor voltage of $0.03\cdot 500=15$ volts is required in order to produce the rotor current in the rotor winding.

Assume now the switch 14 be closed and the audio-frequency generator thereby excited so that the audio-frequency energy flows across 17 to the consumer, which, let us say, puts up such a resistance that by considering the energy flowing via 14 the full torque is set up on the shaft, which in this case must be of the same magnitude as the driving or starting moment of the motor with a slip of $s=3\%$. According to the above prerequisite a current flows thereby in the stator of the audio-frequency generator whose active component should be $J_{1w}=2.6$ A. On the secondary end of the current transformer 15—which for adjusting the phase may consist of an induction regulator—a voltage $E_3'=15$ volts is thereby supposed to be produced being in counter-phase with the voltage $E_3$, so that on the slip rings 9 of the frequency convertor a further potential $E_3''=35$ volts comes into action. By this $E_4$ is momentarily reduced to 35 volts. Consequently an excess of voltage of 15 volts occurs at once in the rotor, which according to what precedes, supplies the rotor current for the full torque of the asynchronous motor.

One salient feature of the invention resides in the fact that for producing the control value—in this case of the regulating voltage $E_3'$—no slip is required, that is to say the tripping of the driving moment ensues directly from the driven end, i. e. from the audio-frequency generator. Hence it is possible to set up an ideal shunt characteristic without having to fear instabilities. A further advantage is that the starting moment occurs instantaneously with the brake moment. Apart from short transient effects the regulating performance happens momentarily. Consequently the arrangement appears suitable also for objects which are liable to load jerks between 0 and full load, say remote control plants on the synchronous selection method. Another feature appears in that the reactive component in the control current $J_1$ does not affect the regulation or, if it does, extremely small in amount. It may, for instance, be highly possible that the audio-frequency generator has to give off quite an appreciable inductive audio-frequency power which, naturally, is derived in part from the exciting current, i. e., from the network. This reactive component, however, merely causes a phase shift of the stator current in the driving motor.

Obviously, in lieu of the current transformer 15 any other device may be employed which supplies a potential in phase and proportional to the watt component of the current $J_1$, say induction regulators, adjustable ring transformers, networks consisting of resistances, inductivities and capacities, thermionic valve amplifiers, separate exciters for the frequency convertor, automatic or high-speed regulators, &c.

Furthermore, it is immaterial whether the frequency convertor be provided with a compensation coil or not. In the case of a compensated frequency convertor it must merely be taken into account that this likewise develops a torque, thus modifying the working conditions insofar as the sum of the torques for all the three machines has to be equal to zero.

Having now particularly described and ascertained the nature of my said invention and in what manner the same is to be performed, I declare that what I claim is:

1. A frequency converting system comprising a three-phase induction motor and a three-phase induction generator driven thereby, said motor and generator having rotor windings and stator windings, means for exciting the stator windings of said motor and generator at one frequency, the generator rotor being driven against the rotating field produced by excitation of the stator windings, a frequency converter connected to be driven by said motor, said converter having stator and rotor windings, means for exciting the rotor winding of said converter at said one frequency, means for feeding slip frequency potentials induced in said converter rotor winding to said motor rotor winding, said converter exciting potential being just large enough to provide a counter E. M. F. in the motor rotor so that power loss due to slip frequency is minimized, means for deriving a potential proportional to the generator exciting power, and means for applying said potential to said frequency converter, said potential deriving means being so arranged that said last-named potential is opposed to the excitation potential of said frequency converter and is so proportioned that as the generator load varies the counter E. M. F. applied to the winding of the motor rotor varies inversely to maintain a constant slip speed in the motor.

2. The system of claim 1 wherein the means for deriving a potential comprises a transformer whose primary winding is in the generator exciting circuit, and whose secondary winding is in the exciting circuit of the frequency converter.

GEORGES OGURKOWSKI.